Oct. 23, 1923.
T. WHITEHEAD
1,471,674
DRIVING APPARATUS FOR RING SPINNING, DOUBLING, AND TWISTING MACHINERY
Filed Jan. 25, 1923    6 Sheets-Sheet 4
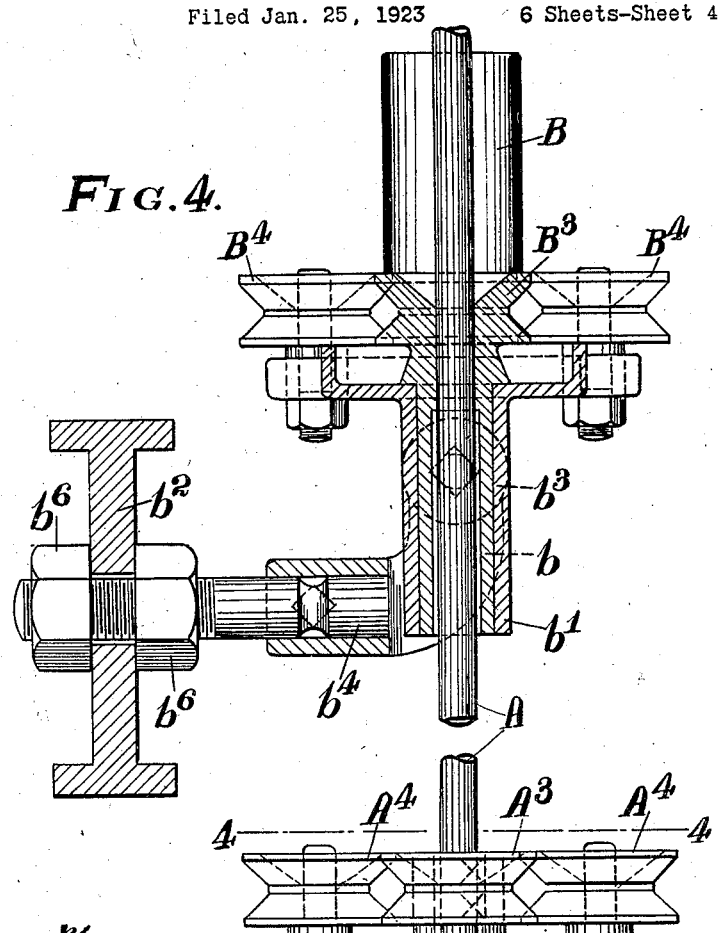
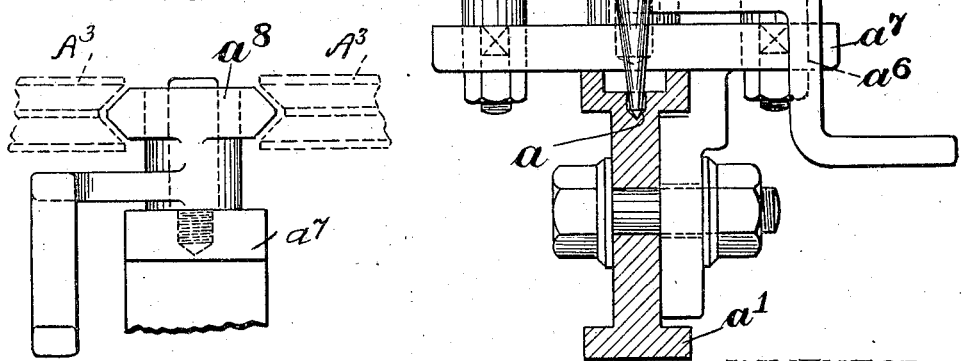
INVENTOR.
Thomas Whitehead,
by Herbert W. Jenner,
Attorney.

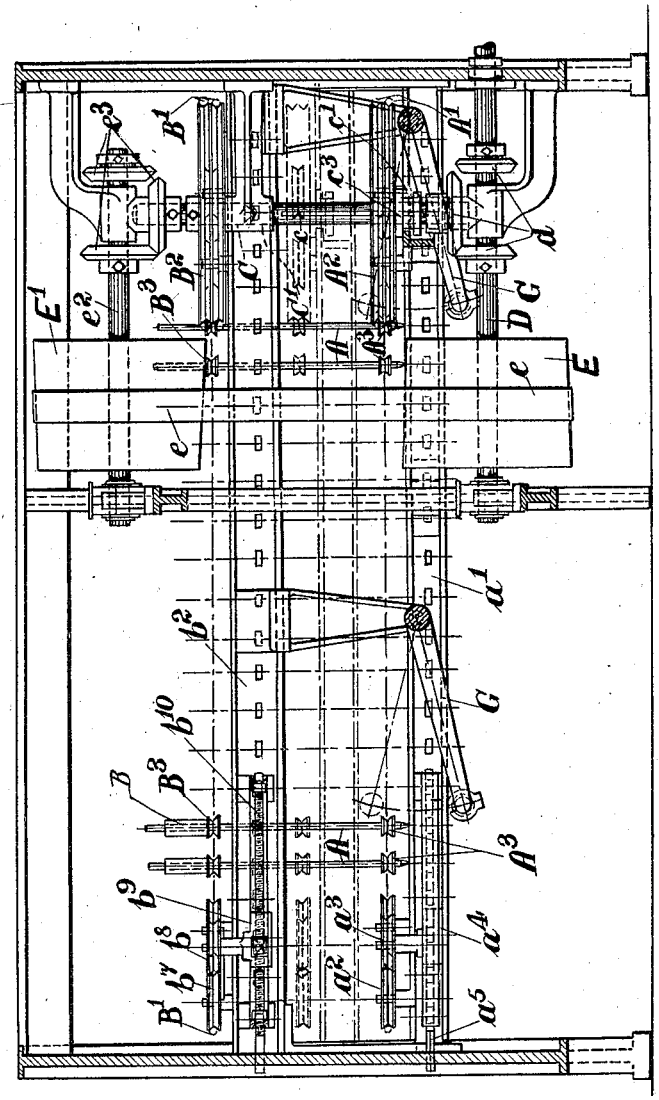

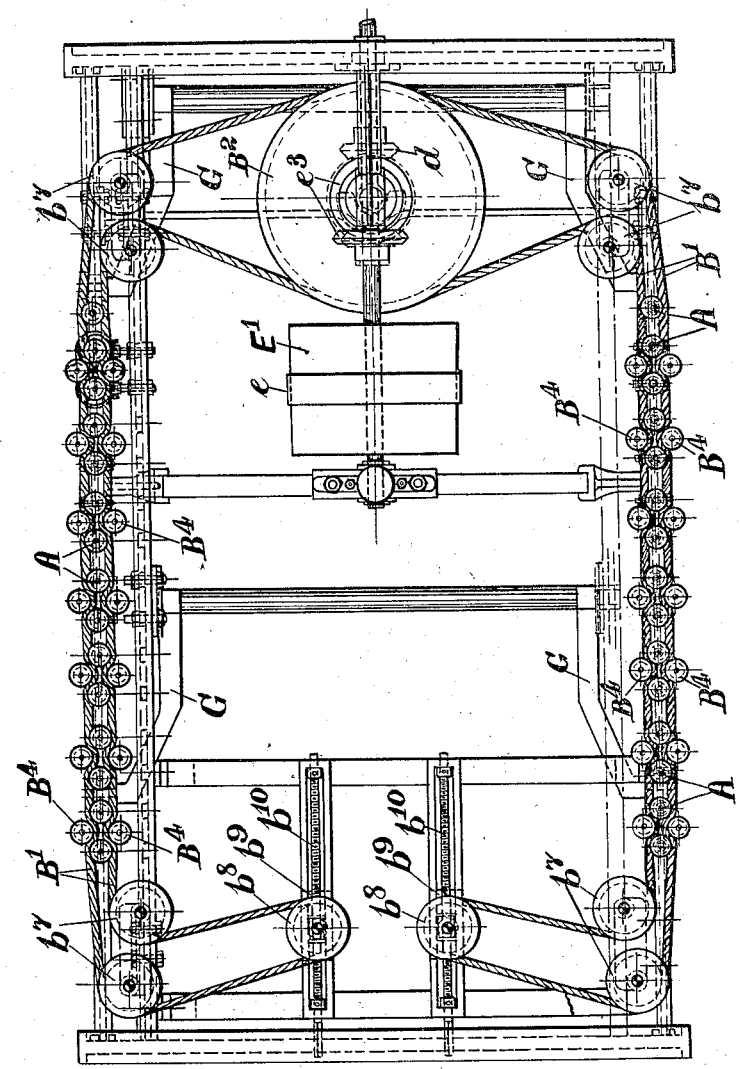

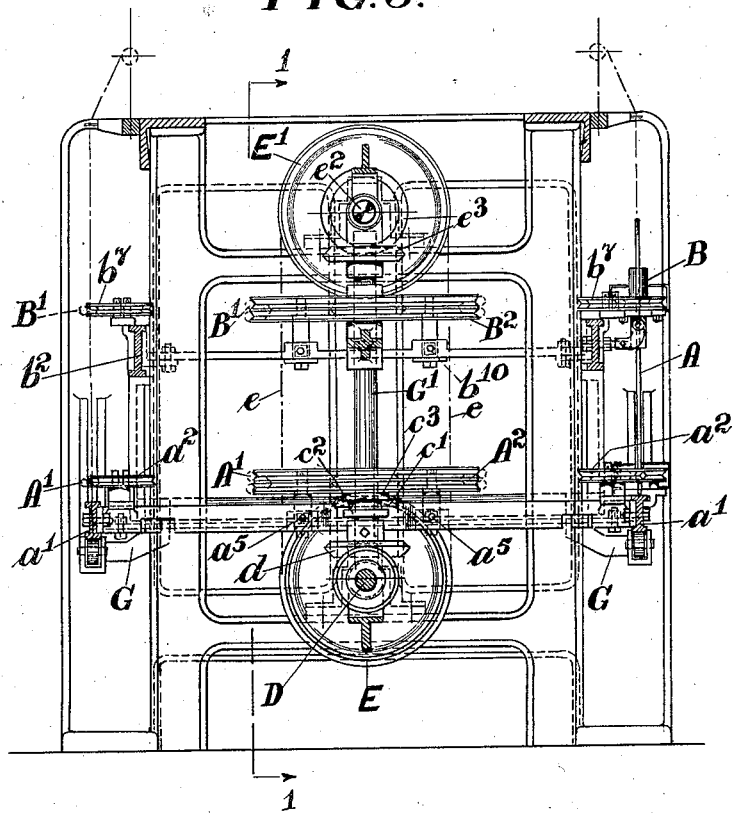

Oct. 23, 1923.  
T. WHITEHEAD  
1,471,674  
DRIVING APPARATUS FOR RING SPINNING, DOUBLING, AND TWISTING MACHINERY  
Filed Jan. 25, 1923   6 Sheets-Sheet 5

INVENTOR.  
Thomas Whitehead,  
by Herbert W. Jenner,  
Attorney

Oct. 23, 1923.

T. WHITEHEAD 1,471,674

DRIVING APPARATUS FOR RING SPINNING, DOUBLING, AND TWISTING MACHINERY

Filed Jan. 25, 1923 — 6 Sheets-Sheet 6

INVENTOR
Thomas Whitehead
by Herbert W. T. Jenner,
Attorney

Patented Oct. 23, 1923.

1,471,674

UNITED STATES PATENT OFFICE.

THOMAS WHITEHEAD, OF QUEENSBURY, ENGLAND.

DRIVING APPARATUS FOR RING SPINNING, DOUBLING, AND TWISTING MACHINERY.

Application filed January 25, 1923. Serial No. 614,846.

*To all whom it may concern:*

Be it known that I, THOMAS WHITEHEAD, residing at Marley House, West Scholes, Queensbury, in the county of York, England, have invented certain new and useful Improvements in Driving Apparatus for Ring Spinning, Doubling, and Twisting Machinery, of which the following is a specification.

This invention relates to apparatus for driving the spindles and rings of ring spinning, doubling, and twisting machinery in which spindles and traveller carriers are driven at relatively different speeds.

According to this invention the spindles and traveller carriers are situated within two endless bands which engage opposite sides of the spindle and carrier wharles and are maintained in driving connection therewith by pulleys adjustably mounted at intervals along the spindle and carrier rails outside the driving bands which are driven in either direction from a stationarily mounted pulley and a rising and falling pulley which rotate at different speeds.

In order that the said invention may be clearly understood and readily carried into effect, the same is described more fully with reference to the accompanying drawings, wherein:—

Fig. 1 is a front elevation, Fig. 2 a plan and Fig. 3 an end view of part of a ring spinning frame provided with spindle and carrier driving apparatus in accordance with this invention.

Fig. 4 is a transverse section of part of a spindle, carrier, rails and driving mechanism drawn to a larger scale.

Figure 5:
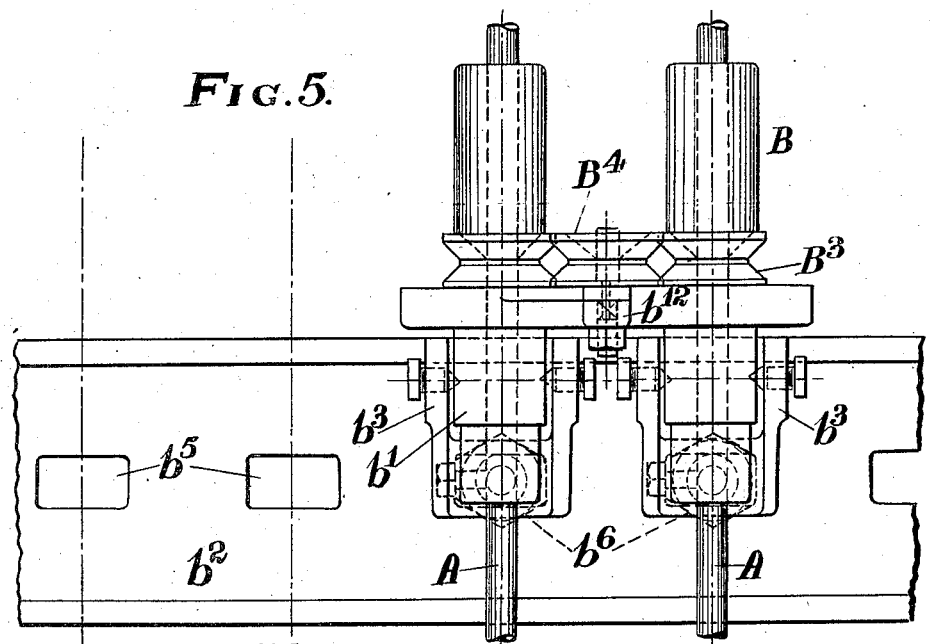
Fig. 5 is a front elevation of part of the carrier rail shewing two spindles and carriers in position.
Figure 6:
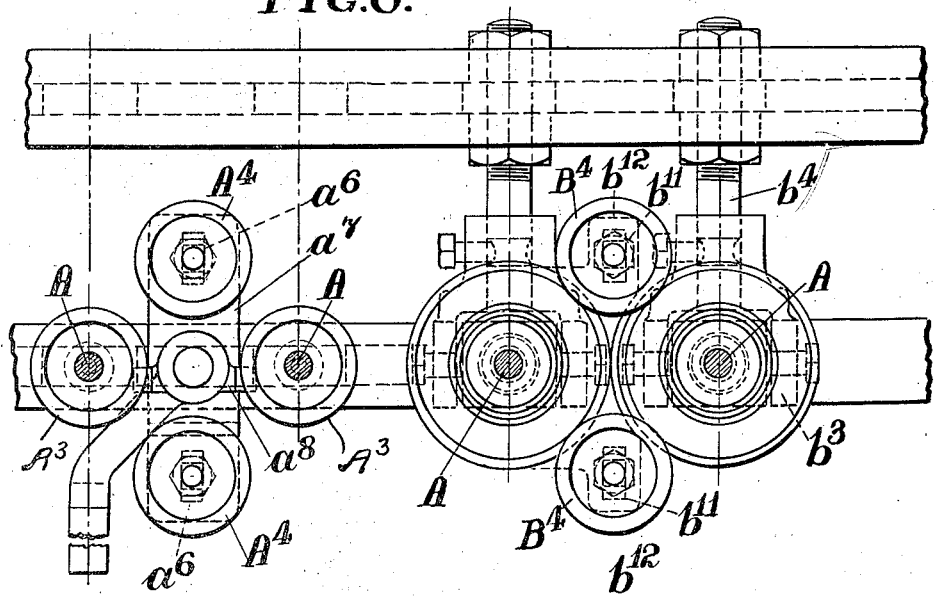
Figure 8:
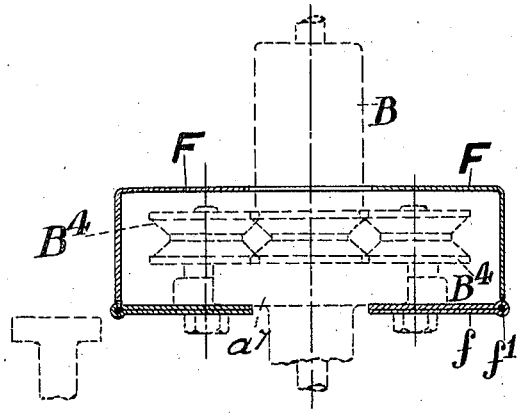
Figure 9:
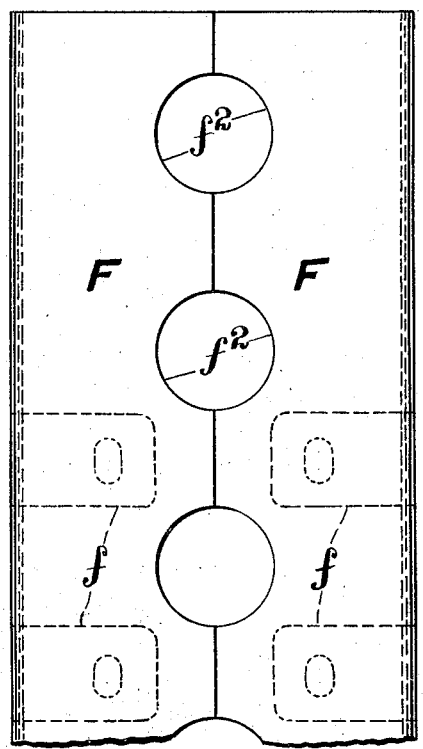

Fig. 6 is a plan view of the parts shown in Fig. 5, and shows also a pair of spindle driving wharles and their grip pulleys. Fig. 7 is a detail plan view of the spindle brake. Fig. 8 is a cross-section, and Fig. 9 is a part plan view of a portion of the cover for the driving wharles of the traveller carriers.

Figure 10:
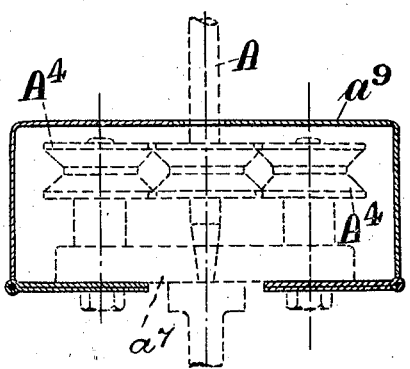
Figure 11:
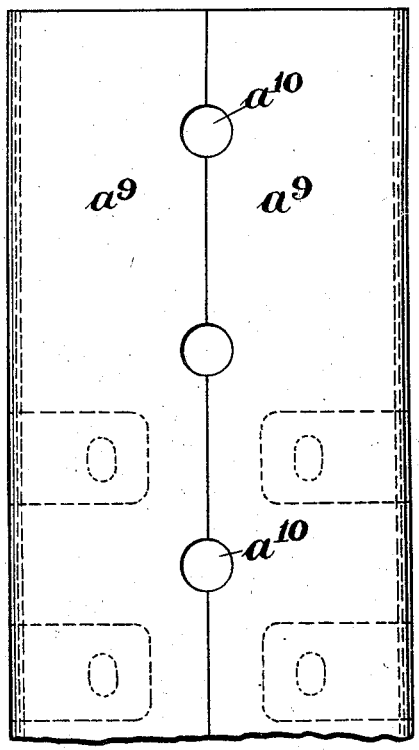

Figs. 10 and 11 are similar views of the cover for the spindle driving mechanism.

A indicates the spindles, B the carriers, $A^1$ the endless bands for driving the spindles and $B^1$ the endless bands for driving the carriers. $A^2$ $B^2$ indicate the main driving pulleys, $A^3$ $B^3$ the wharles appertaining to the spindles and carriers and $A^4$ $B^4$ the adjustably mounted pulleys.

The spindles A are supported in footstep bearings $a$ Fig. 4 in the spindle rail $a^1$ and pass through tubular extensions $b$ of the carriers B. The latter constitute bearings for the spindles A and are advantageously mounted in self aligning bearings $b^1$ in the carrier rail $b^2$. For this purpose each carrier bearing $b^1$ is pivoted in a fork $b^3$ which is rotatably mounted on a horizontal stud $b^4$ which passes through a slot $b^5$ in the rail and is secured in any adjusted position by nuts $b^6$. The carriers and spindles are driven from the aforesaid endless bands $B^1$ $A^1$ and the pulleys $B^2$ $A^2$ for driving the bands are arranged centrally between the two rows of spindles. Each pulley is formed with two grooves Figs. 1 and 3 one to receive the band which drives the carriers, or spindles at one side of the machine and the other to receive the band which drives the carriers, or spindles, at the other side of the machine. These bands pass over guide pulleys $a^2$ $b^7$ and over tension pulleys $a^3$ $b^8$ mounted on sliding carriages $a^4$ $b^9$ which can be moved in one direction or the other by screws $a^5$ $b^{10}$ to regulate the tension of the driving bands. The pulleys $A^2$ $B^2$ are mounted on two vertical shafts C $C^1$ situated one above the other, the lower pulley $A^2$ being slidably mounted on a key $c$ and compelled to rise and fall with the spindle rails $a^1$ by a fork $c^1$ on a cross member of the latter engaging a grooved ring $c^2$ in a boss $c^3$ projecting from the grooved pulley $A^2$. The latter is driven directly in either direction from a main driving shaft D by bevel or other appropriate gearing $d$. A form of mechanism for rotating the spindles and carriers at different speeds comprises a cone pulley E mounted on the main driving shaft D and connected by a belt $e$ with an inversely arranged cone pulley $E^1$ on a shaft $e^2$ which transmits motion to the carrier pulley $B^2$ through bevel or other appropriate gearing $e^3$ at a speed which can be regulated in relation to the spindle pulley $A^2$ by a belt fork which receives a lateral motion by mechanism connected with any ordinary lifter motion for raising and lowering the spindle rails. The direction of rotation of the carriers can be reversed by the aforesaid gearing. If the machine is driven by an electric motor, the direction of rotation and the variable drive of the ring carriers could be obtained by a switch. The endless driving bands $A^1$ $B^1$ are arranged to grip the opposite sides of the wharles $A^3$ $B^3$ on the spindles and carriers by means of the adjustably mounted pulleys $A^4$ $B^4$. In the example shewn in Figure 6 two pulleys $B^4$ are mounted directly opposite to one another in slots $b^{11}$ in a bracket $b^{12}$ which may carry an absorbent pad for supplying lubricant to the carrier bearing. The slots $b^{11}$ in alternative brackets may be used for holding clips or hinge members $f$ for carrying hinged cover plates F. These cover plates may be formed with a beaded edge for the passage of a wire $f^1$ which also passes through the clips or hinge members $f$ and constitutes a hinge pin. The inner edges of the cover plates are formed with semi-circular recesses $f^2$ for the passage of the carriers. Two pulleys $A^4$ are similarly mounted directly opposite to one another in slots $a^6$ in a bracket $a^7$ which is bolted to the spindle rail and carries a pivoted brake $a^8$ adapted to occupy a neutral position between two spindle wharles $A^3$ Figs. 6 and 7, or to be turned on its pivot so that one or other of its end portions will be brought into contact with either of such wharles for bringing the spindle to rest so that the broken end can be found and connected up in the usual way without having to take off the bobbin or cop. Alternate brackets $a^7$ may also carry hinged cover plates $a^9$ which are formed with holes $a^{10}$ for the passage of the spindles in a similar manner to that described with reference to the carrier rail. In an alternative construction each pulley $A^4$ $B^4$ may be mounted on a separate bracket and such pulleys may be staggered in relation to one another outside the endless driving bands $A^1$ $B^1$. The bottom or spindle rails $a^1$ may be lifted by rocker arms G mounted on transverse shafts to which motion may be imparted through any suitable mechanism.

By the invention described the pressure on the spindle and carrier bearings is relieved with the result that their life is increased and the power required to drive the spindles and carriers is reduced. As the adjustment of the tension of the driving band is effected from both sides of the spindles and carriers by applying pressure to the outside of the band, the tension can be regulated to any desired extent without putting any side pull upon the spindles and carriers.

What I claim as my invention and desire to secure by Letters Patent in the United States, is:—

1. In driving apparatus for spinning machines, two separate driving pulleys arranged on the same axis, spindles provided with driving wharles, traveller carriers also provided with driving wharles and journaled concentric with the said spindles, endless driving bands operatively connecting the spindle wharles and the traveller carrier wharles with the respective driving pulleys, and means for driving the said spindles and traveller carriers at relatively different speeds.

2. A driving apparatus as set forth in claim 1, provided with means for varying the speed of the said spindles with relation to the speed of the traveller carriers.

3. A driving apparatus as set forth in claim 1, provided with means for reversing the direction of revolution of the said spindles and traveller carriers.

4. A driving apparatus as set forth in claim 1, the said spindles being arranged in a row, guide pulleys for the driving bands arranged at each end of the said row, and separate means for adjusting the tension of each driving band.

5. A driving apparatus as set forth in claim 1, the driving wharles of the said traveller carriers being provided with tubular portions in which the said spindles are journaled, and means for supporting the said tubular portions pivotally so that the said wharles are free to oscillate.

6. A driving apparatus as set forth in claim 1, the said spindles being arranged in a row, and the driving wharles being protected by covers formed of hinged parts which are separable at the axes of the spindles.

7. In apparatus for driving the spindles and traveller carriers of ring spinning, doubling and twisting machinery at relatively different speeds, the combination of two co-axially arranged driving shafts placed one above the other, a double grooved pulley rigidly fixed on the upper shaft, a double grooved pulley slidably keyed on the lower shaft, means for raising and lowering such pulley, two endles bands passing round opposite sides of the upper pulley and engaging the opposite sides of carrier wharles situated in two rows one at each side of the said pulley, means for regulating the tension of said bands, means for causing the latter to bear against opposite sides of the carrier wharles, two endless bands passing round opposite sides of the lower pulley and engaging the opposite sides of spindle wharles situated in two rows one at each side of the said pulley, means for regulating the tension of said bands, means for causing the latter to bear against opposite sides of the spindle wharles and means for driving the spindles and traveller carriers at relatively different speeds.

8. In apparatus for driving the spindles and traveller carriers of ring spinning, doubling and twisting machinery at relatively different speeds, the combination of two co-axially arranged driving shafts placed one above the other, a double grooved pulley rigidly fixed on the upper shaft, a double grooved pulley slidably keyed on the lower shaft, means for raising and lowering such pulley, two endless bands passing round opposite sides of the upper pulley and engaging the opposite sides of carrier wharles situated in two rows one at each side of the said pulley, means for regulating the tension of said bands, means for causing the latter to bear against opposite sides of the carrier wharles, two endless bands passing round opposite sides of the lower pulley and engaging the opposite sides of spindle wharles situated in two rows one at each side of the said pulley, means for regulating the tension of said bands, means for causing the latter to bear against opposite sides of the spindle wharles and means for driving the spindles and traveller carriers at relatively different speeds, means for varying the speed of rotation of the traveller carriers in relation to the spindles and means for reversing the direction of rotation of the spindles and traveller carriers.

9. In apparatus for driving the spindles and traveller carriers of ring spinning, doubling and twisting machinery at relatively different speeds, a traveller carrier rail having a number of horizontal studs adjustably mounted thereon, a forked arm rotatably mounted on each stud, a traveller carrier bearing pivotally mounted in the fork of each arm, a traveller carrier rotatably mounted in said bearing, and a spindle rotatably mounted in the traveller carrier which forms a bearing therefor.

In testimony whereof I affix my signature.

THOMAS WHITEHEAD.